United States Patent
Valpard

(10) Patent No.: US 9,734,065 B2
(45) Date of Patent: Aug. 15, 2017

(54) METHOD OF MANAGING CONSISTENCY OF CACHES

(71) Applicant: SAGEM DEFENSE SECURITE, Paris (FR)

(72) Inventor: Christian Valpard, Boulogne-Billancourt (FR)

(73) Assignee: SAGEM DEFENSE SECURITE, Boulogne-Billancourt (FR)

(*) Notice: Subject to any disclaimer, the term of this patent is extended or adjusted under 35 U.S.C. 154(b) by 30 days.

(21) Appl. No.: 14/916,915

(22) PCT Filed: Sep. 5, 2014

(86) PCT No.: PCT/EP2014/068990
§ 371 (c)(1),
(2) Date: Mar. 4, 2016

(87) PCT Pub. No.: WO2015/032921
PCT Pub. Date: Mar. 12, 2015

(65) Prior Publication Data
US 2016/0224469 A1    Aug. 4, 2016

(30) Foreign Application Priority Data
Sep. 6, 2013   (FR) ..................... 13 58597

(51) Int. Cl.
*H03M 13/00* (2006.01)
*G06F 12/0817* (2016.01)
(Continued)

(52) U.S. Cl.
CPC ...... *G06F 12/0824* (2013.01); *G06F 11/1004* (2013.01); *G06F 12/0811* (2013.01);
(Continued)

(58) Field of Classification Search
CPC . G06F 12/0824; G06F 12/081; G06F 11/1004
See application file for complete search history.

(56) References Cited

U.S. PATENT DOCUMENTS 5,841,873 A      11/1998  Lockhart et al.
8,296,581 B2 *  10/2012  Jennings ............... G06F 9/3824
                                                                711/100
(Continued)

FOREIGN PATENT DOCUMENTS

EP    1195734    2/2008

OTHER PUBLICATIONS

International Preliminary Report on Patentability with English Language Translation, dated Dec. 16, 2015, Application No. PCT/EP2014/068990.
(Continued)

*Primary Examiner* — Shelly A Chase
(74) *Attorney, Agent, or Firm* — Blakely Sokoloff Taylor & Zafman LLP

(57) ABSTRACT

The present invention relates to a method of transmitting a message comprising an integrity check and a header, between two processing units via a shared memory, comprising steps of: —generation (501), by a first processing unit, of a first pseudorandom binary string; —encryption (502) of the message to be transmitted by applying an involutive transformation dependent on the first pseudorandom binary string generated; —transmission and storage (503) of the encrypted message in the shared memory; —generation (504), by the second processing unit, of a second pseudorandom binary string; —decryption of the message stored by applying an involutive transformation dependent on the second pseudorandom binary string, and by decrypting the header (505) of said message, by verifying the decrypted header (505), and as a function of the result of the verification, by decrypting the complete message (506);
(Continued)

—verification (507) of the integrity of the decrypted message on the basis of its integrity check.

9 Claims, 5 Drawing Sheets

(51) Int. Cl.
    *H04L 9/06*         (2006.01)
    *G06F 11/10*       (2006.01)
    *G06F 12/0811*    (2016.01)
    *G06F 12/14*       (2006.01)
    *G06F 13/16*       (2006.01)
    *H04L 9/30*         (2006.01)
    *H04L 9/32*         (2006.01)

(52) U.S. Cl.
    CPC ...... *G06F 12/1408* (2013.01); *G06F 13/1663* (2013.01); *H04L 9/0656* (2013.01); *H04L 9/0662* (2013.01); *H04L 9/304* (2013.01); *H04L 9/3281* (2013.01); *G06F 2212/1052* (2013.01); *G06F 2212/283* (2013.01); *G06F 2212/621* (2013.01); *H04L 2209/122* (2013.01); *H04L 2209/127* (2013.01)

(56) References Cited

U.S. PATENT DOCUMENTS

| | | | | |
|---|---|---|---|---|
| 8,930,647 | B1 * | 1/2015 | Smith | G06F 9/44557 711/103 |
| 2013/0159596 | A1 * | 6/2013 | Van De Ven | G06F 12/109 711/6 |

OTHER PUBLICATIONS

International Search Report, dated Jan. 14, 2015, Application No. PCT/EP2014/068990.

Rogers, Brian, et al., "Efficient Data Protection for Distributed Shared Memory Mulitprocessors", *Proceedings of the 15th International Conference on Parallel Architectures and Compilation Technique*, (Jan. 1, 2006), 84-94.

Shi, Weidong, et al., "Architectural Support for High Speed Protection of Memory Integrity and Confidentiality in Multiprocessor Systems", *Proceedings of the 13th International Conference on Parallel Architectures and Compilation Techniques*, (Sep. 29, 2004), 123-134.

\* cited by examiner

METHOD OF MANAGING CONSISTENCY OF CACHES

The subject of the invention is a mechanism for managing consistency of caches.

It more particularly concerns a data exchange method between two processing units sharing data via a shared memory.

STATE OF THE ART

To meet ever increasing needs in computing power, the processors used in computer systems must be capable of performing an ever higher number of operations per second. For years the increase in operating frequency of processors has allowed processors to be proposed meeting said increasing demands for computing power. Since an increase in operating frequency also increases released heat, the fineness of processor etching has progressively been reduced to contain the amount of heat to be dissipated within acceptable limits. Nevertheless, the miniaturisation of microprocessor circuits has become ever more complex while etching fineness has been reduced down to below one micrometer and has now reached ten or so nanometers.

As a result, another approach has been investigated to continue increasing the computing power of processors with no or only a slight increase in the heat to be dissipated: the performing in parallel of several operations at the same time instead of seeking to increase the number of operations performed in sequence by one same execution core. Multi-core processors have consequently been developed.

Also, to reduce the execution time of an instruction by a processor each execution core has had a cache memory added thereto. Said memory is a memory located between a core and the random access memory of the system. Since the access time to this memory is much shorter than the access time to the random access memory, the core has quicker access to some of the data stored in memory thereby allowing accelerated execution of instructions.

With a multiprocessor system, each execution core may have said cache memory that is not shared with the other execution cores as illustrated in FIG. 1. In said configuration, the modification by a first core of a datum in shared memory may give rise to inconsistency between the caches of two cores if this datum was also contained in the cache of a second core and was not updated further to modification carried out by the first core. There is hence a risk that the second core will read an incorrect datum in its cache. It is therefore necessary to have available a mechanism ensuring consistency between the caches of the different execution cores of a multicore processor.

One mechanism developed to meet this issue is consistency obtained via "snooping". According to said mechanism, each write in memory transits via a bus shared by all the cores of a processor. By snooping on the shared bus each core therefore has knowledge of the memory write operations by the other cores and is therefore able to update its own cache to ensure consistency thereof with the caches of the other cores.

Since a cache is of reduced size, it is necessary to renew the content of a cache to minimise the probability of occurrence of a cache defect i.e. to maximise the probability that a core will find the data it seeks to read in its cache to avoid having to fetch said data in a cache of higher level or in the RAM. The writing of a datum in a cache and the writing of this same datum in the RAM may be offset in time if a datum modified in a cache is only written in the RAM when this datum is deleted from the cache at the time of its renewal. Depending on the cache renewal algorithm used, it is even possible that the order in which several data are written in memory is not the same order in which these data were previously entered into the cache. It is therefore possible with a snooping consistency mechanism that a second core snooping on the write operation of a first core might acquire knowledge of the change in write pointer of the first core before the corresponding datum has been written or finished being written in the shared memory. The second core may then be led to updating its cache with a datum not corresponding to the datum updated by the first core. Cache consistency is then no longer ensured.

One solution to avoid said problem is to cause the second core to wait a certain time before reading the datum updated in the shared memory, to leave time for the updated datum to be written in the shared memory before a read operation. However said solution slows the updating of caches and may therefore reduce the performance level of the processor.

Another solution is to time-stamp all write operations using a clock shared by the different cores. Therefore a second core detecting write operations by the first core in a shared memory is able to reconstitute the order in which these write operations were performed and can ensure that it reads in the shared memory the datum corresponding to the detected update of the write pointer. However, said solution leans heavily on the resources of the cache consistency mechanism. Each written datum must be stored with its write date thereby increasing the amount of data to be exchanged over the intercore bus and to be stored in the different memories.

There is therefore a need for a cache consistency mechanism ensuring consistency between the caches of the different cores of a computer system, without notably reducing the performance level of said system and without increasing the amount of data to be stored in memory.

PRESENTATION OF THE INVENTION

According to a first aspect the subject of the invention concerns a method of transmitting a message between a first processing unit and a second processing unit via a memory shared by both processing units;

the message to be transmitted comprising an integrity check and a header, each processing unit comprising a generator of pseudorandom binary strings and a cryptographic module;

the generators of the first and second processing units being initialised with one same seed and synchronized with each other;

said method comprising the following steps:
  generation, by the pseudorandom binary string generator of the first processing unit, of a first pseudorandom binary string;
  encryption of the message to be transmitted by the cryptographic module of the first processing unit, by applying to the message to be transmitted an involutive transformation dependent on the generated first pseudorandom binary string;
  transmission and storage of the encrypted message by the first processing unit in the shared memory;
  generation, by the pseudorandom binary string generator of the second processing unit, of a second pseudorandom binary string;
  said first and second binary strings being identical;
  decryption of the message stored in the shared memory by the cryptographic module of the second processing unit, by applying to the stored message an involutive transformation dependent on the second pseudorandom binary string, the decryption of the message comprising the decryption of the header of said message, verification of the decrypted header and, as a function of the result of verification of the header, decryption of the complete message;

the involutive transformations dependent on the first and second pseudorandom binary strings being identical;

verification by the second processing unit of the integrity of the decrypted message on the basis of an integrity check of the decrypted message.

Said method enables the second processing unit to ensure that the message read in memory and decrypted is indeed the one transmitted and stored in the shared memory by the first processing unit. In addition, the use of said header at the time of decryption allows a first verification of the message read in the memory whilst necessitating less computing than the decryption and integrity verification of the complete message. The reading of an incorrect message can therefore be detected more rapidly than by decrypting the complete message.

The involutive transformation dependent on a binary string may be an exclusive OR operation (XOR) applied between said binary string and the message to be encrypted or decrypted.

Said transformation, through its involutive encrypting and decrypting of a message, uses a single transformation whilst requiring reduced computing power for encryption and decryption. In addition, said transformation can be applied bit-by-bit to the message making it possible to decrypt only part of the message in particular the message header.

Verification of the header may comprise a comparison step of the header with a predetermined header.

According to one advantageous, non-limiting characteristic the integrity check is an error detection code.

This error detection code may be a cyclic redundancy check (CRC) or checksum.

The use of said code allows verification that the decryption of the encrypted message read in the memory has been correctly performed and hence that the read message is indeed the one transmitted and stored by the first processing unit in the shared memory.

The shared memory may be a circular buffer memory.

The pseudorandom binary string generators may have a period longer than the bit size of the shared memory.

With a circular buffer memory, it is possible to avoid inadvertent decryption of old data once a write operation has been entered into all the locations of the buffer memory.

According to second aspect the present invention relates to a computer programme product comprising code instructions for execution of a method according to the first aspect when this programme is executed by a processor.

According to a third aspect the present invention relates to a system comprising:

at least one first processing unit configured to access a memory shared with a second processing unit;

said first processing unit comprising:

a generator of pseudorandom binary strings to generate a first pseudorandom binary string;

a cryptographic module to encrypt a message to be transmitted to the second processing unit by applying to the message to be transmitted an involutive function dependent on the generated first pseudorandom binary string;

said message to be transmitted comprising an integrity check and a header;

means to transmit and store the encrypted message in the shared memory;

and at least one second processing unit configured to access said memory shared with said first processing unit;

said second processing unit comprising:

a generator of pseudorandom binary strings to generate a second pseudorandom binary string;

the generators of said first processing unit and said second processing unit being initialised with one same seed and synchronized with one another, and said first and second binary strings being identical;

a cryptographic module to decrypt the encrypted message stored in the shared memory by applying to the stored encrypted message an involutive transformation dependent on the second pseudorandom binary string, the decryption of the message comprising decryption of the header of said message, verification of the decrypted header and, as a function of the result of header verification, decryption of the complete message;

the involutive transformations dependent on the first and second pseudorandom binary strings being identical;

means to verify the integrity of the decrypted message on the basis of an integrity check of the decrypted message.

Said computer programme product and system have the same advantages as those set forth above for the method according to the first aspect.

PRESENTATION OF THE FIGURES

Other characteristics and advantages will become apparent on reading the following description of one embodiment. This description is given with reference to the appended drawings in which:

FIG. 1 schematically illustrates material means in a multiprocessor system;

FIG. 2 schematically illustrates material means in a system according to one embodiment of the invention;

FIG. 3 schematically illustrates material means in a system according to another embodiment of the invention;

DETAILED DESCRIPTION

One embodiment of the invention concerns a method of transmitting a message between two processing units of a computer system via a memory shared by these two processing units.

Figure 1:
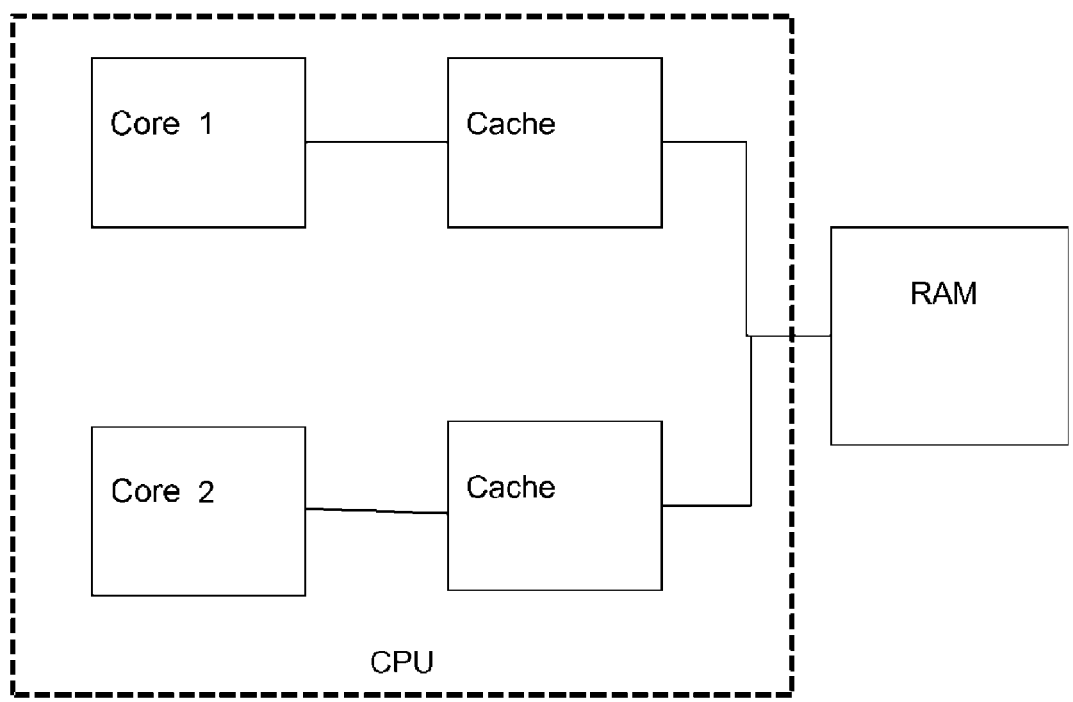
Figure 2:
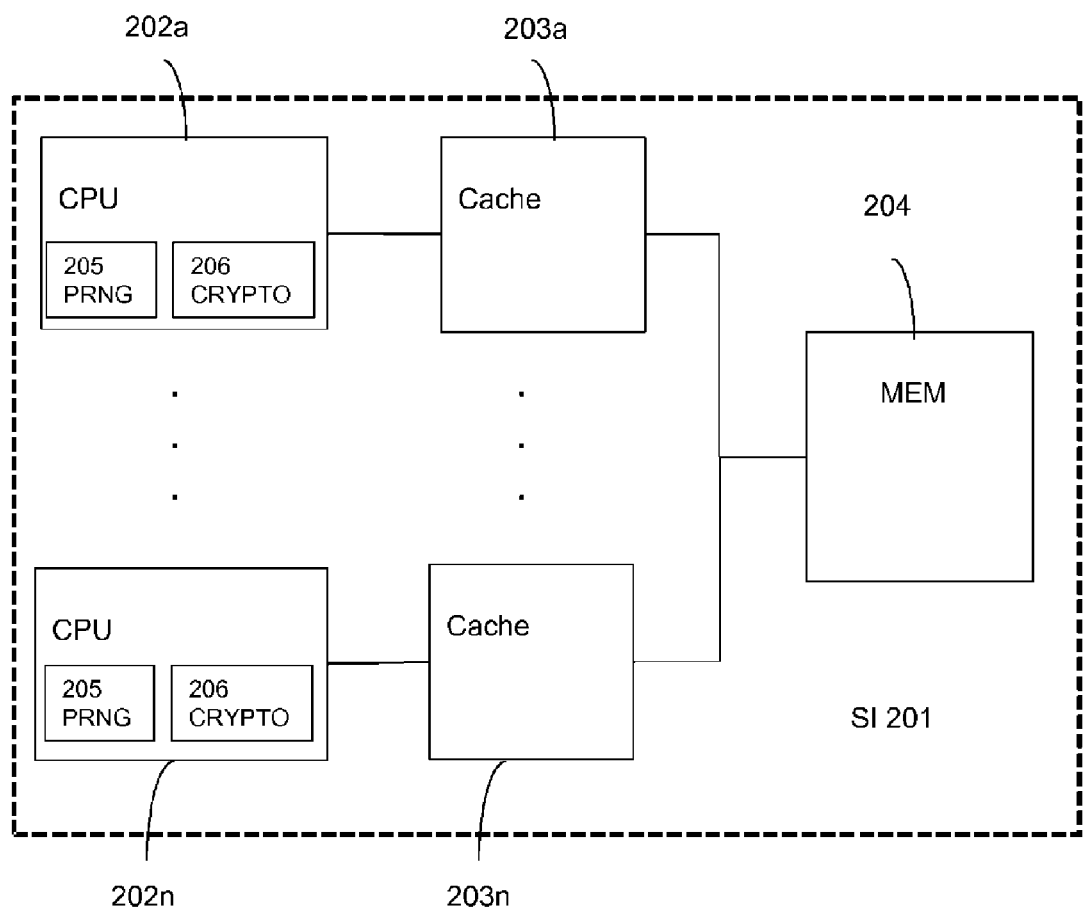

As illustrated in FIG. 2, these processing units may be two processors of one same multiprocessor computer system 201 comprising several processors 202a, . . . , 202n. Each processor 202a, . . . , 202n is linked to a cache memory 203a, . . . , 203n. The cache memories 203a, . . . , 203n are not shared. Only the processor to which a cache memory belongs is able to read its content.

Figure 3:
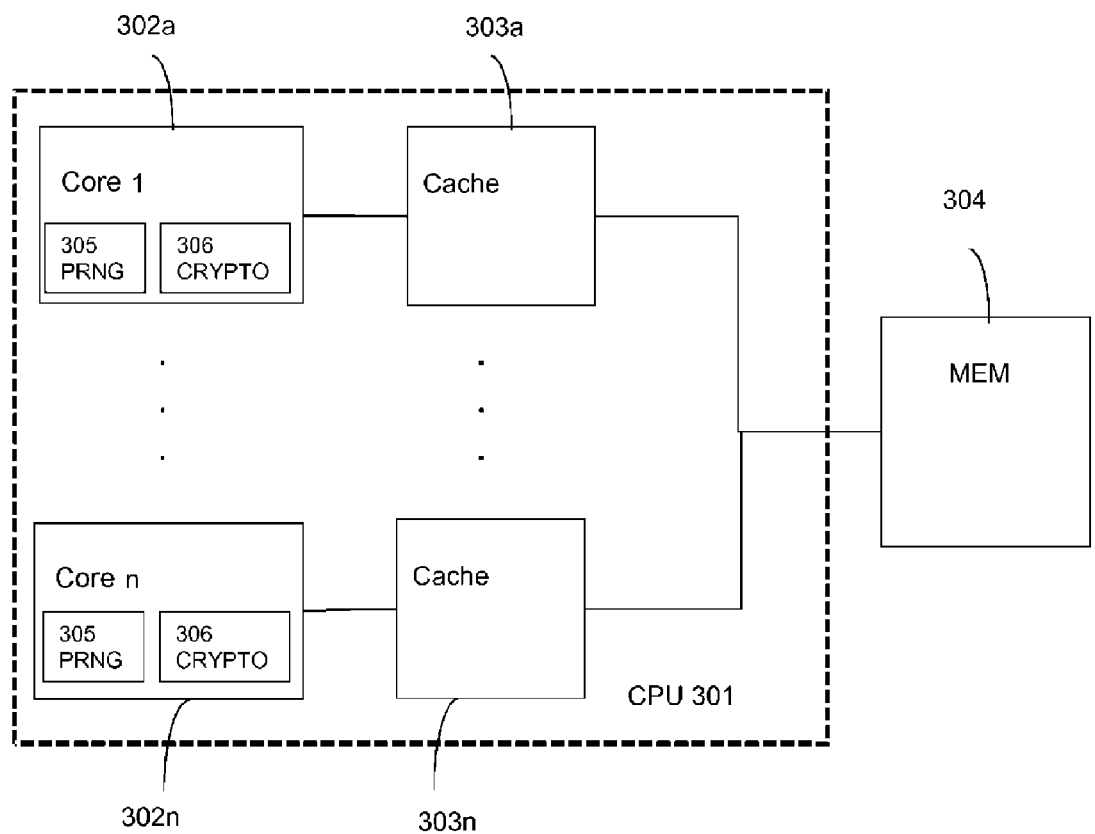

According to one variant illustrated in FIG. 3, the processing units are execution cores among the execution cores 302a, . . . , 302n integrated within a single processor 301. According to said variant, each execution core is linked to its own nonshared cache memory 303a, . . . , 303n.

The cache memories 203a, . . . , 203n and 303a, . . . , 303n may be cache memories of level 1, level 2 or a higher level.

All the cache memories are linked to a shared memory 204, 304 having read and write accessibility for all the processors $202a, \ldots 202n$ and for all the execution cores $302a, \ldots, 302n$. According to a first variant, said shared memory may be a cache memory of higher level than the non-shared cache memory $203a, \ldots, 203n, 303a, \ldots, 303n$, hence a cache memory of level 2 or higher. According to another variant, the shared memory 204, 304 is the random access memory of the computer system.

The shared memory 204, 304 may be a circular buffer memory able to implement FIFO-type logic.

Each processing unit comprises a generator of pseudorandom binary strings 205, 305 e.g. a linear-feedback shift register ("LSFR") or a linear congruential generator ("LOG"), and a cryptographic module 206, 306.

The generators of pseudorandom binary strings 205, 305 of all the processing units are initialised with one same ("seed") and are synchronized with one another.

The cryptographic module enables the processing units to encrypt and decrypt a message to be exchanged.

The encryption and decryption of a message comprise the application to the message to be encrypted or decrypted of one same transformation fSi dependent on one same pseudorandom binary string Si that is involutive i.e. verifying fSi·fSi=id. This pseudorandom binary string Si is identically generated by the generator of pseudorandom binary strings of each processing unit for the encryption and decryption of one same message, the generators being initialised with one same seed and remaining synchronized with one another.

According to a first variant, the involutive transformation fSi corresponds to application of an EXCLUSIVE OR operation between the message to be encrypted or decrypted and the pseudorandom binary string Si generated by the processing units.

According to a second variant, the involutive transformation fSi corresponds to the difference between the binary number defined by string Si and the binary number corresponding to the binary message to be encrypted or decrypted.

Therefore after a message has been written in the shared memory, a processing unit seeking to update its cache can be sure that the message it reads in the memory is indeed the detected write message.

Figure 4:
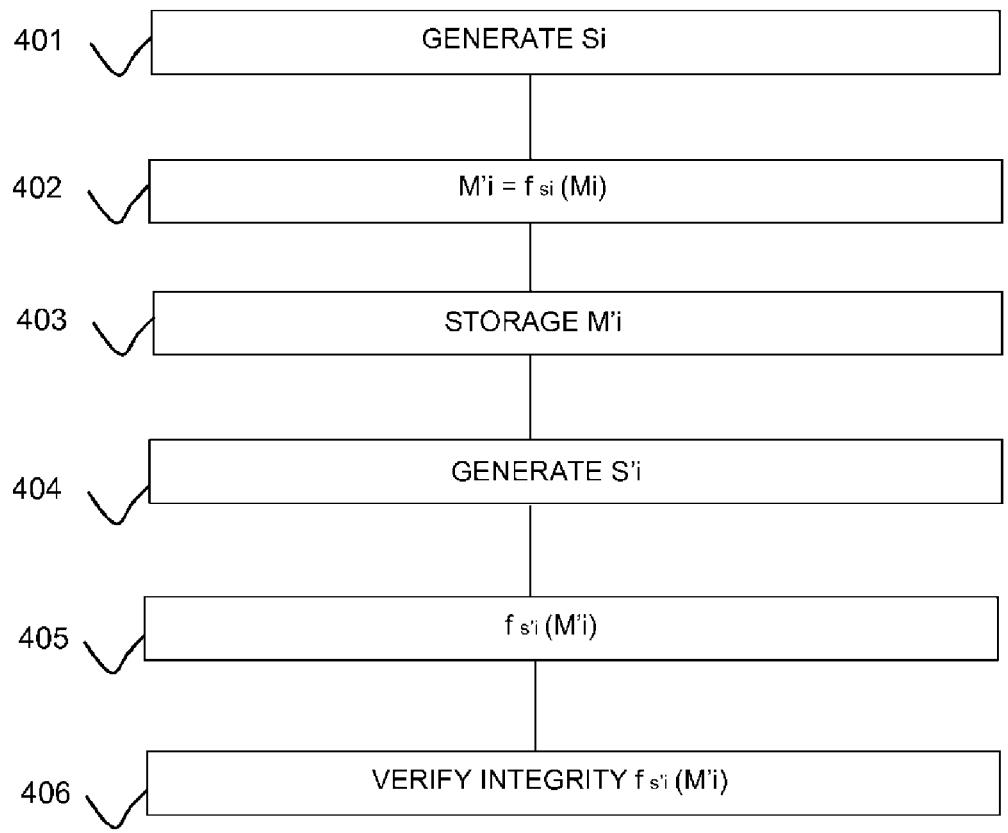
FIG. 4 is a diagram schematising an example of embodiment of a check method according to a first embodiment of the invention.

More specifically, a first embodiment of a check method of a message exchanged between two processing units via a shared memory is described below with reference to FIG. 4.

The exchanged message Mi comprises an integrity check. It can therefore result from encoding allowing error detection such as a cyclic redundancy check ("CRC"). It may also for example comprise a checksum.

At a first step 401, the generator of pseudorandom binary strings of a first processing unit transmitting the message generates a first pseudorandom binary string Si. If the generated binary string is the first string generated after initialisation of the generator, it corresponds to the first string of the sequence of strings corresponding to the seed used. If at least one binary string has already been previously generated after initialisation of the generator, the binary string generated at the first step 401 is the following string of this sequence.

At a second step 402, the cryptographic module of the first processing unit transmitting the message encrypts the message to be exchanged by applying thereto a transformation fSi dependent on the first pseudorandom binary string generated at the first step 401, the transformation being involutive i.e. it verifies the equation fSi·fSi=Id, Id being the identity function. It is therefore possible both to encrypt and decrypt a message with the same transformation.

At a third step 403, the encrypted message (M'i=fSi(M)) is transmitted and stored by the first processing unit in the shared memory;

At a fourth step 404, a second processing unit wishes to read access the message M'i stored in the shared memory via its cache. The generator of pseudorandom binary strings of this second processing unit therefore generates a second binary string S'i. This generator of binary strings was initialised with the same seed as the seed used to initialise the generator of the first step 401 and these two generators have remained synchronized with each other since their initialisation. Therefore the second binary string S'i generated at the fourth step 404 is identical to the first binary string Si generated at the first step 401.

At a fifth step 405, the second processing unit reads the encrypted message M'i stored in the shared memory via its cache. Its cryptographic module then decrypts the encrypted message M'i by applying thereto an involutive transformation fS'i dependent on the second pseudorandom binary string S'i. This transformation fS'i is identical to transformation fSi since the second pseudorandom binary string S'i is identical to the first random binary string Si. The decryption of the encrypted message then produces the message to be exchanged which was encrypted at the second step 402 (fS'i(M'i)=fS'i(fSi(Mi))=fSi(fSi(Mi))=Id(Mi)=Mi).

If the second processing unit reads encrypted data in the shared memory corresponding to a message M'j differing from message M'i to be exchanged, for example because this read occurs before the encrypted message M'i has been written in the shared memory, the second processing unit will be unable to decrypt this message correctly. The encrypted message read in the shared memory will have been encrypted with a transformation fSj differing from transformation fSi since it was defined in relation to a binary string Sj differing from the first binary string Si. When decrypting this message encrypted with function fS'i, the cryptographic module of the processing unit will obtain the result fS'i(M'j)=fS'i(fSj(Mj))=fSi(fSj(Mj)) which therefore corresponds neither to Mi nor to Mj.

At a sixth step 406, the second processing unit verifies the integrity of the decrypted message by means of its integrity check. If the transmitted message was successfully decrypted at the fifth step 405, the message is intact and the second processing unit seeking to update its cache has proof that it has read the right message in the shared memory. Conversely, if decryption has not been carried out correctly at step five 405, the decrypted message is not intact and the second processing unit then knows that the message read in the shared memory is not the message sought after to update its cache.

According to one variant, in the event of failure of verification of the integrity of the decrypted message, the second processing unit again performs step five 405 after a predefined lapse of time.

The generators of pseudorandom binary strings 205, 305 may have a longer period than the bit size of the shared memory. This makes it possible with a circular buffer memory for example to avoid inadvertently decrypting an old value when the memory has completed a loop i.e. once a write has been entered into all locations of the memory and the locations containing old data are reused to write more recent data therein.

Figure 5:
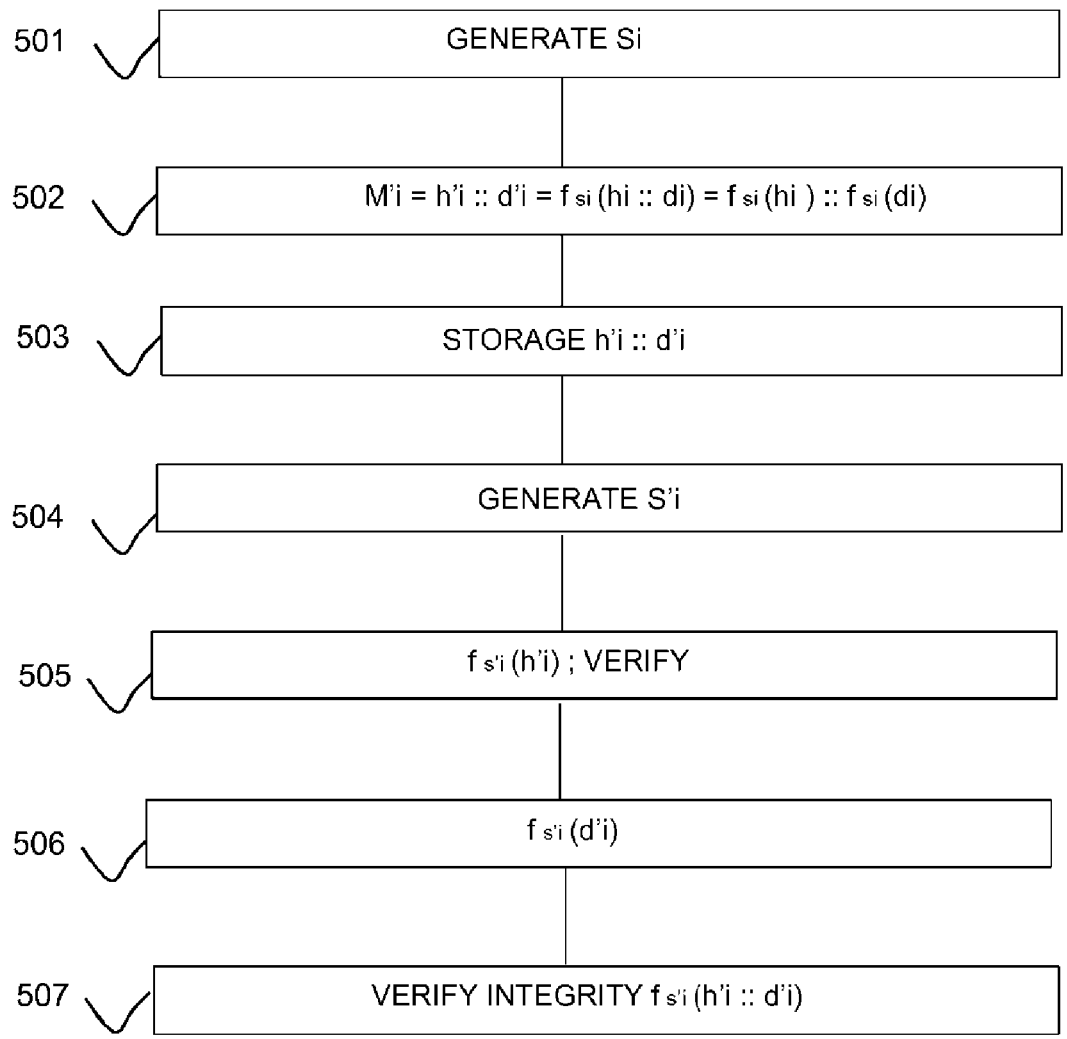
FIG. 5 is a diagram schematising an example of embodiment of a check method according to a second embodiment of the invention.

A second embodiment of a method to check a message exchanged between two processing units via a shared memory is described below with reference to FIG. 5.

The exchanged message Mi comprises an integrity check. It may therefore result from encoding allowing error detection such as a cyclic redundancy check (CRC). It may also comprise a checksum for example.

The exchanged message Mi also comprises a predetermined header hi of n bit length.

At a first step 501, similar to first step 401 of the method according to a first embodiment described above, the generator of pseudorandom binary strings of the first processing unit transmitting the message generates a pseudorandom binary string Si. If the generated binary string is the first string generated after initialisation of the generator, it corresponds to the first string of the sequence of strings corresponding to the seed used. If at least one binary string has already been previously generated after initialisation of the generator, the binary string generated at the first step 501 is the following string in this sequence.

At a second step 502, similar to second step 402 of the method according to the first embodiment described above, the cryptographic module of the first processing unit transmitting the message encrypts the message to be exchanged by applying thereto a transformation fSi dependent on the first pseudorandom binary string Si generated at the first step 501, the transformation being involutive i.e. it verifies the equation fSi·fSi=Id, Id being the identity function. It is therefore possible both to encrypt and decrypt a message with the same transformation.

In this embodiment it must be possible for the transformation fSi to be applied also to the n first bits of an encrypted message so as only to decrypt the header h'i of the encrypted message. For example, if this transformation is an exclusive OR function it can solely be applied between the n first bits of the string Si and of the encrypted message so as only to decrypt the header.

At a third step 503, the encrypted message (M'i=h'i:: d'i=fSi(Mi)=fsi (hi::di)) is transmitted and stored by the first processing unit in the shared memory.

At a fourth step 504, similar to the fourth step 404 of the method described above, a second processing unit wishes to read access the message M'i stored in the shared memory. The generator of pseudorandom binary strings of this second processing unit then generates a second pseudorandom binary string S'i. This generator of binary strings was initialised with the same seed as the generator used at the first step 501 and these two generators have remained synchronized with one another since their initialisation. Therefore the second binary string S'i generated at the fourth step 504 is identical to the first binary string Si generated at the first step 501.

At a fifth step 505, the second processing unit reads the encrypted message M'i stored in the shared memory at the third step 503. Its cryptographic module then decrypts solely the header h'i of the encrypted message M'i by applying thereto an involutive transformation fS'i dependent on the second pseudorandom binary string S'i. The second pseudorandom binary string S'i being identical to the first pseudorandom binary string Si, the transformation fS'i is identical to transformation fSi. The decrypting of the header h'i of the encrypted message M'i then produces the predetermined header hi used as header of message Mi which was encrypted at the second step 502.

If the second processing unit reads encrypted data in the shared memory corresponding to a message M'j differing from message M'i to be exchanged, for example because this read operation occurs before the encrypted message M'i has been written in the shared memory, the second processing unit will be unable to decrypt the message header correctly. The encrypted message read in the shared memory will have been encrypted with a different transformation fSj and not transformation fSi since it was defined as a function of a different binary string Sj to binary string Si. When decrypting the header of this message encrypted with transformation fS'i, the result obtained by the cryptographic module of the processing unit will be fS'i(fSj(hj)) which does not correspond to the predetermined header hi or hj used as header for messages Mi and Mj.

If the decrypting of the header of the encrypted message has not produced the predetermined header, the second processing unit again performs step four 504 after a predefined lapse of time.

If the decrypting of the header of the encrypted message produces the predetermined header, the second processing unit performs following step six 506.

At the sixth step 506, the cryptographic module of the second processing unit decrypts the remainder of the encrypted message M'i read in the shared memory by applying thereto involutive transformation fS'i dependent on the second pseudorandom binary string S'i. This transformation fS'i is identical to transformation fSi since the second pseudorandom binary string S'i is identical to the first random binary string Si. The decrypting of the encrypted message then produces the message to be exchanged which was encrypted at the second step 502 (fS'i(M'i)=fS'i(fSi (Mi))=fSi(fSi(Mi))=Id(Mi)=Mi).

At a seventh step 507, the second processing unit verifies the integrity of the decrypted message using its integrity check. If the transmitted message was successfully decrypted at step six 506, the message is intact and the second processing unit has proof that it has read the right message in the shared memory. Conversely, if decryption was incorrectly performed at step six 506, the decrypted message is not intact and the processing unit knows that the message read in the shared memory is not the desired message.

According to one variant in the event of failure of the integrity check of a decrypted message, the second processing unit again performs step five 505 after a predefined lapse of time.

The invention claimed is:

1. A method of transmitting a message between a first processing unit and a second processing unit via a memory shared by both processing units, each of said processing units being linked to a separate cache memory
   the message to be transmitted comprising an integrity check and a predetermined header,
   each processing unit comprising a generator of pseudorandom binary strings and a cryptographic module;
   the generators of the first and second processing units being initialised with one same seed and synchronised with one another;
   said method comprising the following steps:
   generation, by the pseudorandom binary string generator of the first processing unit, of a first pseudorandom binary string;
   encryption of the message to be transmitted by the cryptographic module of the first processing unit by applying to the message to be transmitted an involutive transformation dependent on the generated first pseudorandom binary string;
   transmission and storage of the encrypted message by the first processing unit in the shared memory
   generation, by the pseudorandom binary string generator of the second processing unit, of a second pseudorandom binary string;

said first and second binary strings being identical;

decryption of the message stored in the shared memory by the cryptographic module of the second processing unit, by applying to the stored message an involutive transformation dependent on the second pseudorandom binary string, the decryption of the message comprising decryption of the header of said message, verification of the decrypted header and, as a function of the result of header verification, decryption of the complete message;

the involutive transformations dependent on the first and second pseudorandom binary strings being identical;

verification by the second processing unit of the integrity of the decrypted message on the basis of an integrity check of the decrypted message, so that the second processing unit seeking to read said message to be transmitted for updating of its cache memory is able to verify that it has read this message in the shared memory.

2. The method according to claim 1, wherein the involutive transformation dependent on a binary string is an exclusive OR operation (XOR) applied between said binary string and the message to be encrypted or decrypted.

3. The method according to claim 1, wherein the verification of the header comprises a step to compare the header with a predetermined header.

4. The method according to claim 1, wherein the integrity check is an error detection code.

5. The method according to claim 4, wherein the error detection code is a cyclic redundancy check (CRC) or checksum.

6. The method according to claim 1, wherein the shared memory is a circular buffer memory.

7. The method according to claim 1, wherein the pseudorandom binary string generators have a longer period than the bit size of the shared memory.

8. A computer programme product comprising code instructions to implement a method according to claim 1 when this programme is executed by a processor.

9. A system comprising:

at least one first processing unit configured to access a memory shared with a second processing unit, and configured to be linked to a first cache memory, said first processing unit comprising:

a generator of pseudorandom binary strings to generate a first pseudorandom binary string;

a cryptographic module to encrypt a message to be transmitted to the second processing unit by applying to the message to be transmitted an involutive transformation dependent on the generated first pseudorandom binary string;

said message to be transmitted comprising an integrity check and a predetermined header, means to transmit and store the encrypted message in the shared memory and at least one second processing unit configured to access said memory shared with said first processing unit, and configured to be linked to a second cache memory separate from said first cache memory, said second processing unit comprising:

a generator of pseudorandom binary strings to generate a second pseudorandom binary string;

the generators of said first processing unit and said second processing unit being initialised with one same seed and synchronised with one another, and said first and second binary strings being identical;

a cryptographic module to decrypt the encrypted message stored in the shared memory by applying to the encrypted stored message an involutive transformation dependent on the second pseudorandom binary string, the decryption of the message comprising decryption of the header of said message, verification of the decrypted header and, as a function of the result of header verification, decryption of the complete message;

the involutive transformations dependent on the first and second pseudorandom binary strings being identical;

means to verify the integrity of the decrypted message on the basis of the integrity check of the decrypted message, so that the second processing unit seeking to read said message to be transmitted for updating of the second cache memory is able to verify that it has read this message in the shared memory.

\* \* \* \* \*